US008923488B2

(12) United States Patent
Emerick

(10) Patent No.: US 8,923,488 B2
(45) Date of Patent: Dec. 30, 2014

(54) EMERGENCY CALL SYSTEM WITH DISTRIBUTION MANAGEMENT AND MECHANISM METHOD OF OPERATION THEREOF

(75) Inventor: Clark A. Emerick, Redmond, WA (US)

(73) Assignee: Zetron, Inc., Redmond, WA (US)

( * ) Notice: Subject to any disclaimer, the term of this patent is extended or adjusted under 35 U.S.C. 154(b) by 49 days.

(21) Appl. No.: 13/523,821

(22) Filed: Jun. 14, 2012

(65) Prior Publication Data

US 2012/0321054 A1 Dec. 20, 2012

Related U.S. Application Data

(60) Provisional application No. 61/498,782, filed on Jun. 20, 2011.

(51) Int. Cl.
*H04M 11/04* (2006.01)
*H04M 3/51* (2006.01)

(52) U.S. Cl.
CPC ............ *H04M 3/5116* (2013.01); *H04M 11/04* (2013.01)
USPC .......................................................... 379/45

(58) Field of Classification Search
USPC .................................................... 379/37–45
See application file for complete search history.

(56) References Cited

U.S. PATENT DOCUMENTS

| | | | | |
|---|---|---|---|---|
| 5,206,903 A | * | 4/1993 | Kohler et al. | 379/265.12 |
| 5,592,542 A | * | 1/1997 | Honda et al. | 379/266.05 |
| 5,598,460 A | * | 1/1997 | Tendler | 455/404.2 |
| 6,222,919 B1 | * | 4/2001 | Hollatz et al. | 379/265.12 |
| 6,519,324 B1 | | 2/2003 | Guevara et al. | |
| 6,744,858 B1 | | 6/2004 | Ryan et al. | |
| 2002/0006191 A1 | * | 1/2002 | Weiss | 379/265.01 |
| 2002/0090947 A1 | | 7/2002 | Brooks et al. | |
| 2003/0108186 A1 | * | 6/2003 | Brown et al. | 379/266.01 |
| 2003/0169870 A1 | * | 9/2003 | Stanford | 379/265.12 |
| 2003/0191676 A1 | | 10/2003 | Templeton | |
| 2004/0203569 A1 | | 10/2004 | Jijina et al. | |
| 2004/0240659 A1 | | 12/2004 | Gagle et al. | |
| 2007/0269023 A1 | * | 11/2007 | Klauer et al. | 379/37 |
| 2008/0205630 A1 | * | 8/2008 | Deshpande | 379/266.01 |
| 2009/0109959 A1 | * | 4/2009 | Elliott et al. | 370/352 |
| 2011/0009085 A1 | | 1/2011 | Albanes et al. | |
| 2012/0092157 A1 | | 4/2012 | Tran | |
| 2012/0101873 A1 | | 4/2012 | Lepore et al. | |
| 2012/0115448 A1 | | 5/2012 | Rosenhaft et al. | |

OTHER PUBLICATIONS

International Search Report dated Sep. 14, 2012 for PCT Application No. PCT/US2012/043090.

\* cited by examiner

*Primary Examiner* — Maria El-Zoobi
(74) *Attorney, Agent, or Firm* — Ishimaru & Associates LLP

(57) ABSTRACT

A method of operation of an emergency call system includes: receiving an incoming call by a call controller; distributing a pending call request from the call controller to a selected group of workstations; and accepting the pending call request by one of the workstations including removing the pending call request from all others of the workstations in the selected group.

20 Claims, 6 Drawing Sheets

EMERGENCY CALL SYSTEM WITH DISTRIBUTION MANAGEMENT AND MECHANISM METHOD OF OPERATION THEREOF

CROSS-REFERENCE TO RELATED APPLICATION

This application claims the benefit of U.S. Provisional Patent Application Ser. No. 61/498,782 filed Jun. 20, 2011, and the subject matter thereof is incorporated herein by reference thereto.

TECHNICAL FIELD

The present invention relates generally to an emergency call center system, and more particularly to a system for managing a volume of telephone calls that require immediate response.

BACKGROUND ART

Centrally located call processing centers, or call centers, are a key part of emergency service response processes. Modern communication centers are becoming multimedia-capable and often service both analog and various forms of digital media interactions and transactions. In order to service a large public client base, state-of-the-art telecommunications equipment, software applications, and various dedicated servers are compiled and integrated with state-of-the-art software platforms.

In some settings, however, technology has not had such a dramatic impact. For example, an emergency call center (e.g., a 911 call center) typically has limited technological resources that it can draw upon to handle emergency calls. Some call centers may only include a telephone interface to handle incoming calls, a radio dispatch interface to alert the relevant authorities, and a call routing system to direct incoming calls to the appropriate operators. As another example, an appliance maintenance hotline may include a telephone interface to handle incoming calls, a technician that responds to the telephone calls, and a pre-generated service manual stored on a local machine that the technician may consult while handling the call.

E911 or 911 service involves providing call centers or public safety access points (PSAPs) that answer 911 calls and dispatch emergency personnel based on the calls. An important part of E911 service is identifying and dispatching the emergency personnel to the location of the emergency. In order to facilitate such identifying and dispatching, conventional public switched telephone network (PSTN) switches store and provide street address information to PSAPs for 911 calls.

In order for emergency personnel to be dispatched to the correct location, the Automated Number Information (ANI) and Automatic Location Information (ALI) data is used for identifying a communication device from which said incoming call originated. Thus, when a portable IP communications device is moved from one geographic location to another, the geographic location information in the service provider's database should be updated.

Thus, a need still remains for an emergency call system with distribution management. In view of the critical nature of emergency calls, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an emergency call system including: receiving an incoming call by a call controller; distributing a pending call request from the call controller to a selected group of workstations; and accepting the pending call request by one of the workstations including removing the pending call request from all others of the workstations in the selected group.

The present invention provides an emergency call system, including: a call controller for receiving an incoming call; and a selected group of workstations for receiving a pending call request from the call controller and accepting the pending call request by one of the workstations includes the pending call request withdrawn from all others of the workstations in the selected group.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
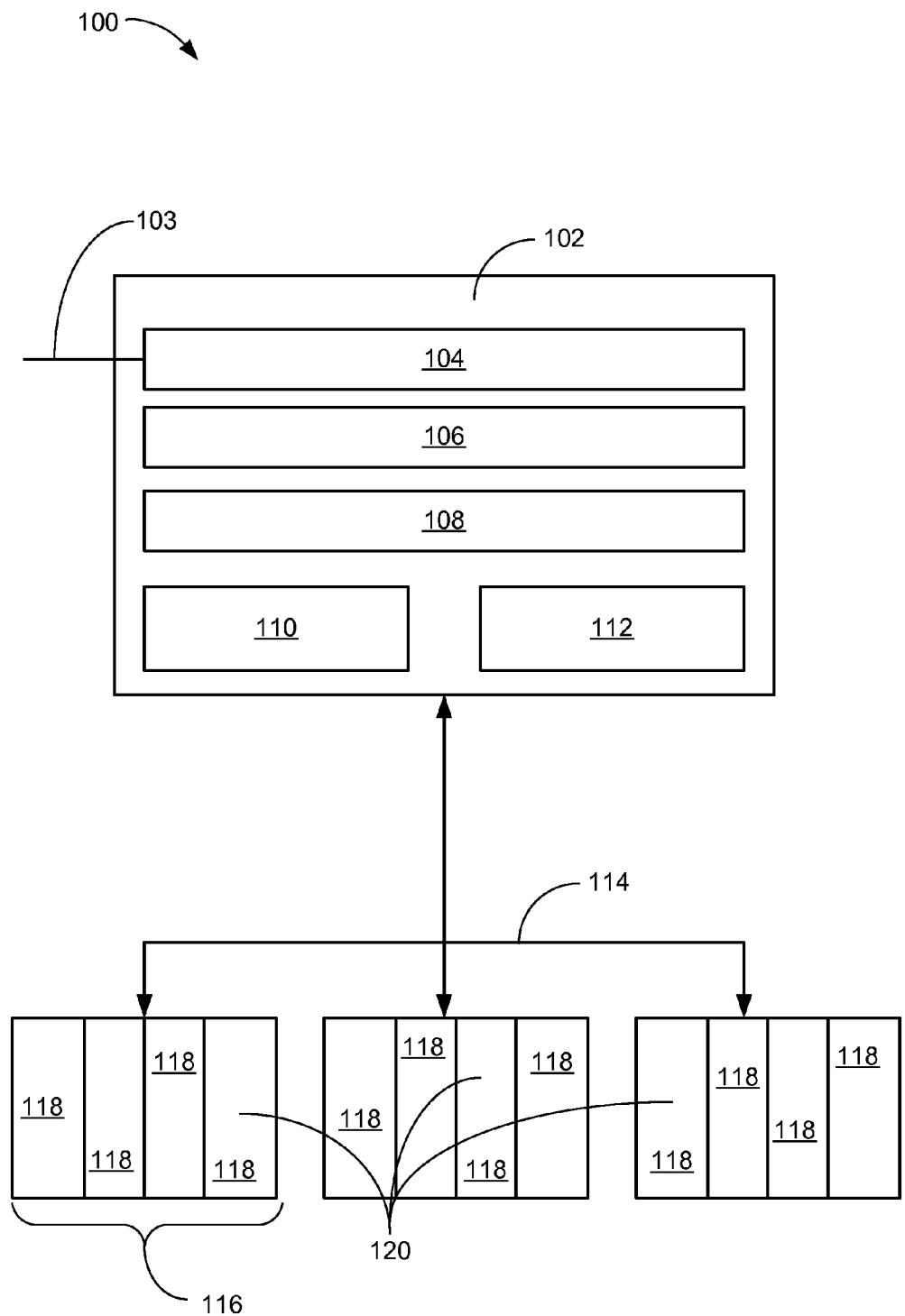
FIG. 1 is a functional block diagram of an emergency call system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The same numbers are used in all the drawing FIGS. to relate to the same elements. The embodiments have been numbered first embodiment, second embodiment, etc. as a matter of descriptive convenience and are not intended to have any other significance or provide limitations for the present invention.

The term "processing" as used herein includes receiving calls, calculating a distribution, comparing expertise, checking availability, and distributing the calls.

Referring now to FIG. 1, therein is shown a functional block diagram of an emergency call system 100 in a first embodiment of the present invention. The functional block diagram of the emergency call system 100 depicts a centralized call center controller 102. The centralized call center controller 102 receives incoming calls from a trunk line 103, such as a session initiated protocol (SIP), internet protocol (IP), voice over internet protocol (VOIP), or plain old telephone service (POTS).

The trunk line 103 is connected to a call controller 104, such as a telephone switch, a VOIP controller, an IP controller, or an SIP controller. The call controller 104 can receive calls from the trunk line 103 and perform pre-processing of an incoming call. The call controller 104 is coupled to an automatic call distribution engine (ACD) 106.

The automatic call distribution engine 106 can support an interactive voice response (IVR) system (not shown), which can support call behavior rules that provide a definable call management process. The automatic call distribution engine 106 is coupled to a mid-call recovery controller 108. The mid-call recovery controller 108 can include an IP switch, control logic, and a memory. The mid-call recovery controller 108 can provide call-back service for dropped emergency calls as well as call history information.

The mid-call recovery controller 108 can be coupled to call servers 110 and console servers 112. The call servers 110 and the console servers 112 can provide management of active call information as well as history and statistical analysis of repeat calls. The call servers 110 and the console servers 112 can couple to a communication interface 114, such as an Internet protocol communication, Ethernet, or optical network. The communication interface 114 can be implemented by any interface technology that can support the Internet protocol communication, including a wireless interface.

The communication interface 114 can couple more than one call center module 116. The call center module can be a separate location or banks of equipment in a single location. The call center module 116 can include a group of workstations 118. The workstations 118 provide a user interface for accessing the incoming calls and invoking emergency resources to address the issues. It is understood that the FIG shows a limited number of the workstations 118 by way of an example and any number of the workstations 118 can be supported by the call servers 110 and the console servers 112.

During operation the console servers can load an operator qualifications from the workstation 118 indicating the capabilities of the operator that is logged into the workstation 118. The operator qualifications can provide a criteria for routing the incoming call. The automatic call distribution engine 106 can utilize the operator qualification as criteria for offering the call to a selected group 120 of workstations 118. A call cannot be linked to any of the workstation 118 without the operator of the workstation 118 accepting the incoming transaction. As one of the workstations 118 accepts the incoming call and becomes engaged in emergency response, the incoming call is removed from the workstations 118 that did not select the incoming call. The automatic call distribution engine 106 can manage the distribution to other units of the call center module 116 based on activity level and the operator qualification registered in the console servers 112. In some cases the selected group 120 of the workstations 118 can span across multiple units of the call center module 116.

It has been discovered that the emergency call system 100 can provide scalable and efficient support for managing incoming emergency calls. The ability to offer an incoming call to the selected group 120 of the workstations 118 based on the qualifications of the operator logged into the workstation 118, provides a flexible emergency call management structure and improves the efficiency of distribution. When a workstation 118 accepts an incoming call the pending call indicator is removed from all of the selected group 120 of the workstations 118 in the distribution.

When the centralized call center controller 102 receives an incoming call through the trunk line 103, the call controller 104 can capture the origin information and convey the call to the automatic call distribution engine 106. The automatic call distribution engine 106 uses the call location, call type, and any forwarded special skill requirement to route the call. The automatic call distribution engine 106 uses the location information to identify an appropriate one of the call center module 116. If any of the available call center modules 116 has a correct set of the operator qualification for a workstation 118, it will be included in distribution of the call offering. If the interface of the call center module 116 is busy for any reason, that information flows up through the console servers 112 and is available to the automatic call distribution engine 106 for formulating call routing offerings.

Figure 2:
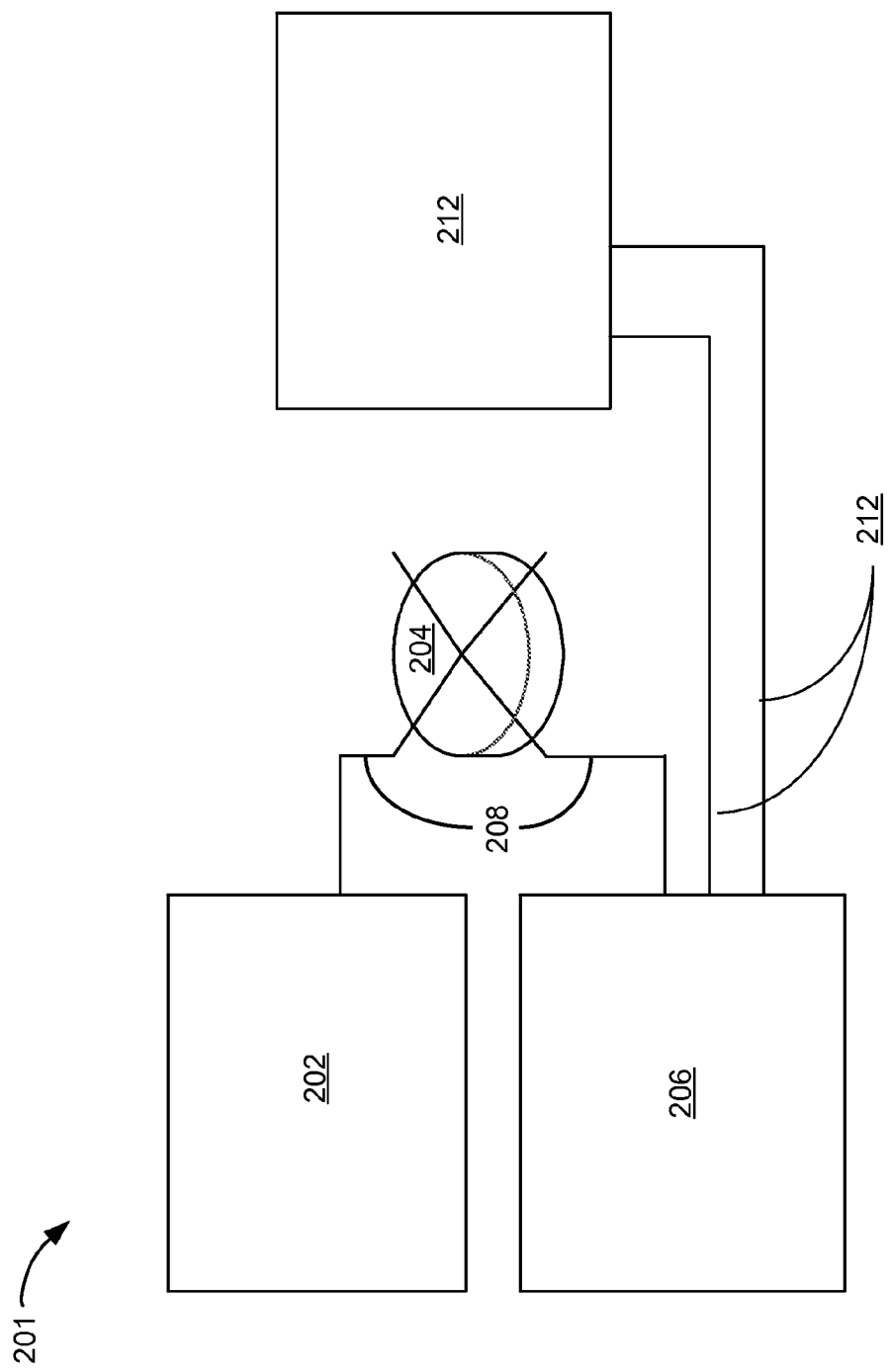
FIG. 2 is an architectural block diagram of the emergency call system for capacity planning in an embodiment of the present invention.

Referring now to FIG. 2, therein is shown an architectural block diagram of the emergency call system 201 for capacity planning in an embodiment of the present invention. The architectural block diagram of the emergency call system 201 depicts a first emergency call center 202. The first emergency call center 202 can be coupled to a central database manager 204, such as a network attached storage system or a storage area network. The modular nature of the central database manager 204 can provide a flexible base for supporting larger or smaller planned support loads.

A second emergency call center 206 can be substantially similar to the first emergency call center 202. The support of the planned workload can be sustained on either the first emergency call center 202 or the second emergency call center 206, in case of system failure. Both the first emergency call center 202 and the second emergency call center 206 actively engage in supporting the emergency response. The interface connection 208 to the central database manager 204 can be a high speed Ethernet, optical, wireless, or a combination thereof.

A back-up interface 210 can be coupled between the second emergency call center 206 and a back-up center 212. The back-up center 212 can provide real-time back-up of the call activity that is passing through the central database manager 204.

It has been discovered that the use of the back-up center 212 can provide an additional layer of reliability in maintaining the operational status of the combination of the first emergency call center 202 and the second emergency call center 206. The real-time back-up capability of the back-up center 212 can help provide 99.999% system up-time. The reliability level is required in support of the critical emergency situations, such as 9-1-1 calls.

Figure 3:
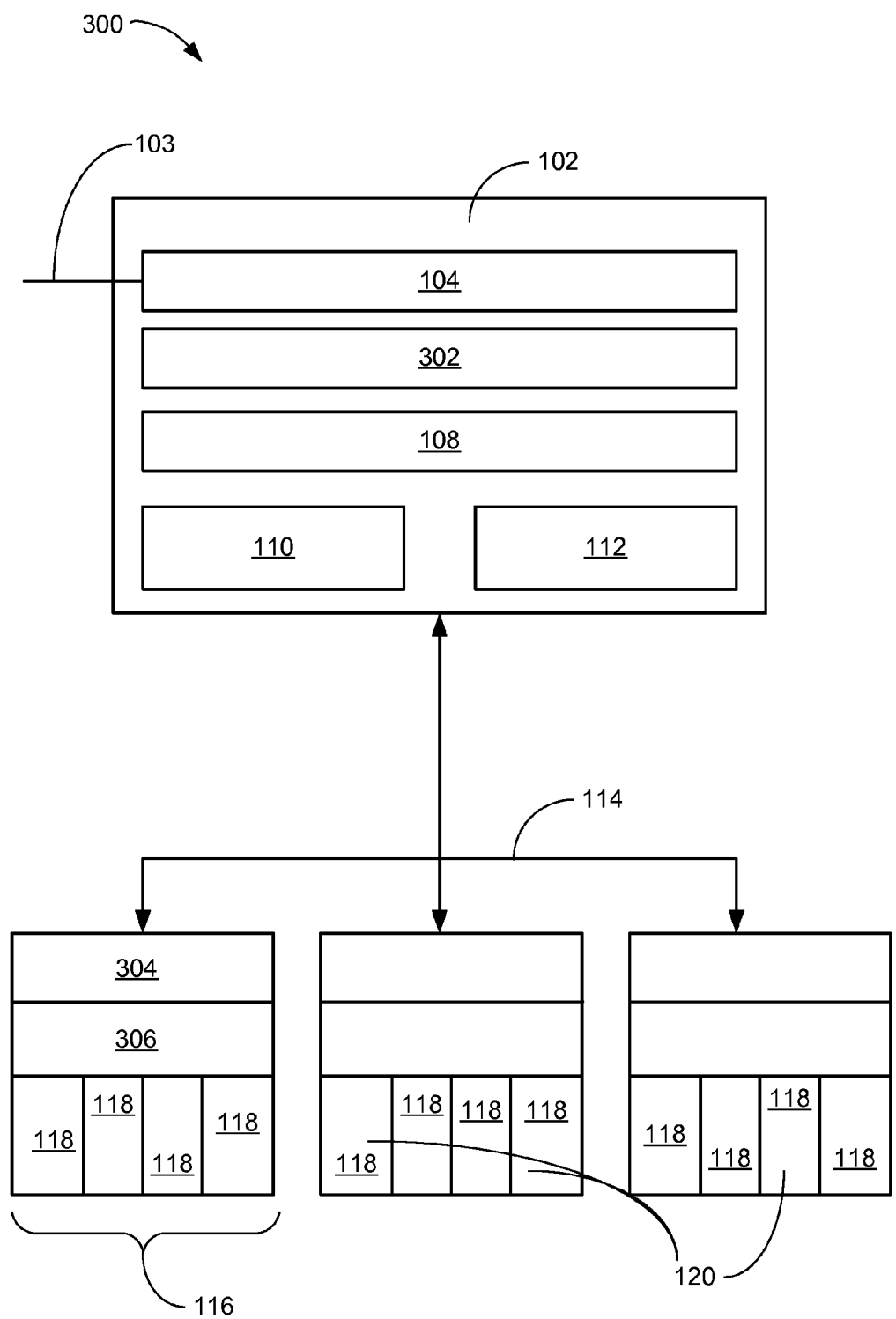
FIG. 3 is a functional block diagram of an emergency call system in a second embodiment of the present invention.

Referring now to FIG. 3, therein is shown a functional block diagram of an emergency call system 300 in a second embodiment of the present invention. The functional block diagram of an emergency call system 300 depicts a clustered configuration of the emergency call system 300.

The centralized call center controller 102 receives incoming calls from the trunk line 103, such as a session initiated protocol (SIP), internet protocol (IP), voice over internet protocol (VOIP), or plain old telephone service (POTS).

The trunk line 103 is connected to the call controller 104, such as the telephone switch, the VOIP controller, an IP controller, or an SIP controller. The call controller 104 can receive calls from the trunk line 103 and perform pre-processing of an incoming call. The call controller 104 is coupled to a database engine 302.

The database engine 302 can support call behavior rules that provide a definable call management process. The database engine 302 is coupled to the mid-call recovery controller 108. The mid-call recovery controller 108 can include an IP switch, control logic, and a memory. The mid-call recovery controller 108 can provide call-back service for dropped emergency calls as well as call history information.

The mid-call recovery controller 108 can be coupled to call servers 110 and console servers 112. The call servers 110 and the console servers 112 can provide management of active call information as well as history and statistical analysis of repeat calls. The call servers 110 and the console servers 112 can couple to the communication interface 114, such as the Ethernet or optical network. The communication interface 114 can be implemented by any interface technology that can support the Internet protocol communication, including the wireless interface.

The communication interface 114 can couple more than one call center module 116, such as a public safety access point (PSAP). The call center module 116 can be a separate location or banks of equipment in a single location. The call center module 116 can include the group of workstations 118. The workstations 118 provide the user interface for accessing the incoming calls and invoking emergency resources to address the issues. It is understood that the FIG shows a limited number of the workstations 118 by way of an example and any number of the workstations 118 can be supported by the call servers 110 and the console servers 112.

Remote call controllers 304 are not required at every one of the call center module 116 but in an optional embodiment the call is routed directly to all of the workstations 118 and the decision of which of the workstations 118 will get the call is made within each of the workstations 118 based on the operator qualification of the call taker logged on to the workstations 118. A remote ACD 306 can be coupled between the remote call controller 304 and the workstations 118. The remote ACD 306 can support an interactive voice response (IVR) system (not shown), which can support call behavior rules that provide a definable call management process. The remote ACD 306 is coupled to the workstations 118.

During operation the console servers 112 can load an operator qualifications from the workstation 118 indicating the capabilities of the operator that is logged into the workstation 118. The operator qualifications can provide a criteria for routing the incoming call to the selected group 120 of the workstations 118. The automatic call distribution engine 106 can utilize the operator qualification as criteria for offering the call to the workstation 118. A call cannot be linked to any of the workstation 118 without the operator of the workstation 118 accepting the incoming transaction. As one of the workstations 118 accepts the incoming call and becomes engaged in emergency response, the incoming call is removed from the workstations 118 that did not select the incoming call. The automatic call distribution engine 106 can manage the distribution to other units of the call center module 116 based on activity level and the operator qualification registered in the console servers 112.

It has been discovered that the emergency call system 100 can provide scalable and efficient support for managing incoming emergency calls. The ability to offer an incoming call to multiple workstations 118 based on the qualifications of the operator logged into the workstation 118, provides a flexible emergency call management structure and improves the efficiency of distribution. When a workstation 118 accepts an incoming call the pending call indicator is removed from the other workstations in the distribution.

Figure 4:
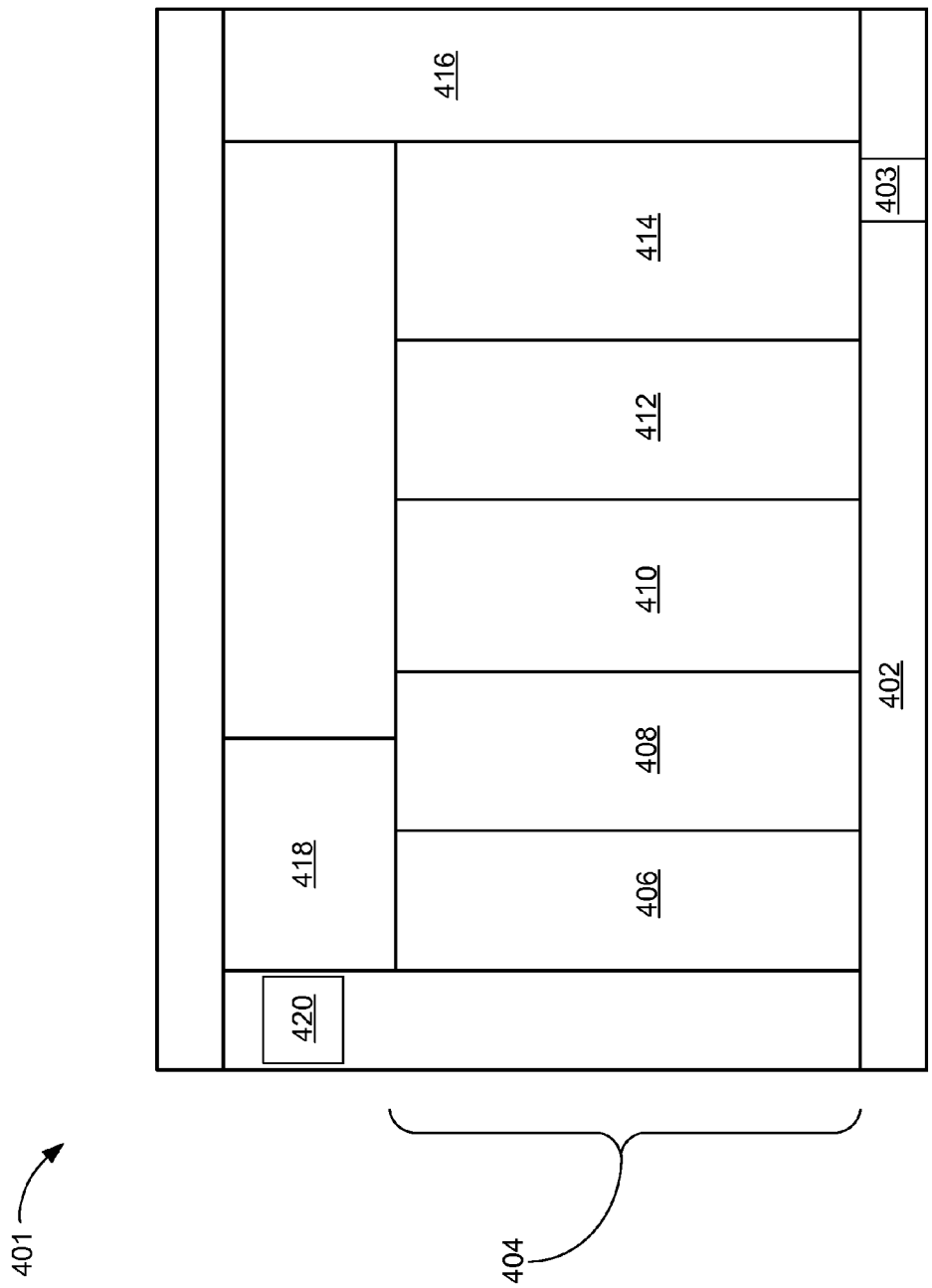
FIG. 4 is a functional display view of a monitor for the emergency call system.

Referring now to FIG. 4, therein is shown a functional display view of a monitor 401 for the emergency call system 100. The functional display view of the monitor 401 depicts a tool bar 402 for providing fast access to support programs. A call pending request 403 indicates that an incoming call has been matched to the operator qualification module 420 and the operator of the workstation is offered the incoming call.

A working call panel 404 provides all of the current information required to support an emergency resource response to an incoming call. The working call panel 404 can include a history frame 406, containing information about the call location or the caller, a notes panel 408 for saving comments from the call taker, an audio file screen 410 containing audio files of the incoming emergency calls, a map window 412 displaying the area around the current call location, and a picture or video frame 414 for displaying pictures of the emergency personnel or video from street camera sources.

A rapid access toolbar 416 can be positioned on a right most vertical edge and include speed dial buttons configured by the call taker, radio dispatch buttons for accessing emergency resources by radio and radio linking buttons for forming patches. A caller ID panel 418, located above the working call panel 404 can display the caller identification information including name, address, and telephone number.

It is understood that the current configuration can be modified by the call taker when he logs into the workstation 118 of FIG. 1. It has been discovered that the information displayed on the monitor 401 can be more effective if the call taker is only subjected necessary information for executing the working call. As information or processes are no longer essential they shrink to rapid access icons on the monitor 401.

An operator qualification module 420 contains detailed information about the call taker that is logged into one of the workstations 118. The login process utilizes the contents of the operator qualification module 420 to update the call controller 104 of FIG. 1. The call controller 104 can make call routing decisions based on the automatic location information (ALI) and the contents of the operator qualification module 420. It has been discovered that the generation of the selected group 120 of FIG. 1 of the workstations 118 can be based on the location information of the caller based on the ALI and the operator qualification information from the operator qualification module 420.

Figure 5:
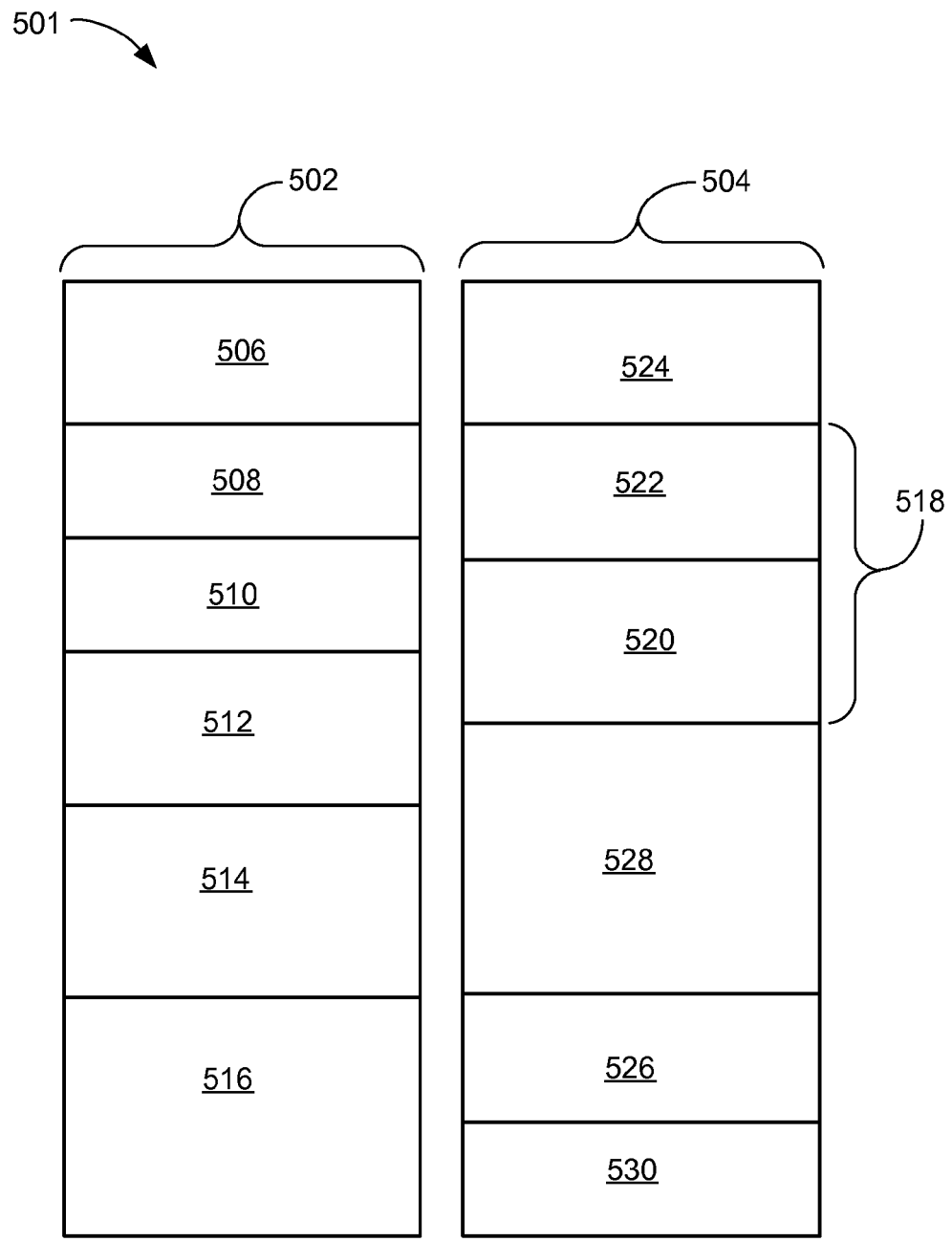
FIG. 5 is a functional block diagram of an installation rack of the emergency call system.

Referring now to FIG. 5, therein is shown a functional block diagram of an installation rack 501 of the emergency call system 100 of FIG. 1. The functional block diagram of the installation rack 501 depicts a first rack 502 and a second rack 504.

The first rack 502 can contain the operational elements of the emergency call system 100 of FIG. 1. An automatic location indicator module 506 can be located in the first rack 502. A call control module 508 can receive the incoming calls and process them to display on the monitor 401 of FIG. 4. Call history servers 510 can store pertinent information about the calls and how they were serviced. The call history servers 510 can maintain information on each call that can track whether the call is a repeat occurrence, which of the workstations 118, of FIG. 1 previously accepted the call, what were the contents of the operator qualification module 420 of FIG. 4 during the previous call, the nature of the emergency of the previously accepted call, and the time of the last call from that same number. In addition the call history servers 510 can link any notes provided by the operator of the workstations 118 that accepted any of the previous occurrences of the call as well as a list of all of the workstations 118 in the selected group 120 that were offered the call.

Console servers 512 can provide software to the workstations 118 of FIG. 1 that can enable peer-to-peer communication between the workstations 118, enable display of information from the history servers 510, and provide execution interfaces to communication switches 514, such as Internet protocol (IP) switches. The combination of the console servers 512 and the communication switches 514 can establish local area networks that can support one or more of the public safety access points.

Hot swap power supplies 516 can help maintain a record of reliability. The hot swap power supplies 516 can have a primary and a back-up power supply for supporting each of the functional elements in the first rack 502 and the second rack 504. The hot swap power supplies can include battery back-up (not shown). The first rack 502 and the second rack 504 can maintain operational status through multiple failures with no loss of performance.

The second rack 504 can support communication gateways 518. A primary communication subsystem 520, such as a Centralized Automatic Message Accounting (CAMA) subsystem, can be used to support the historic analog telephone system, which is known as plain old telephone service (POTS). A secondary communication subsystem 522, such as a FXS/FXO, analog telephone connection system, T1 trunk interface, or ISDN-PRI subsystem interface, can provide additional system connectivity. The primary communication subsystem 520 and the secondary communication subsystem 522 convert the incoming calls to a session initiated protocol (SIP) for communication through the communication switches 514 to the call control module 508 for further routing to the selected group 120 of FIG. 1.

An alarm panel 524 can indicate system status as well as the individual call status. An alarm subsystem 526 can work in conjunction with the alarm panel 524 in order to monitor the operational status of the emergency call system 100 as well as the individual calls being serviced by the workstations 118.

In order to provide high availability, multiple copies of the communication gateways 518 are supported within the installation rack 501 and the SIP calls utilize the mid-call recovery mechanism 528 in order to support a rapid resumption mode in the case of a dropped call or subsystem failure when the back-up subsystem is invoked.

An expansion bay 530 can be provided to allow expansion and growth of the installation rack 501. It is understood that any number of the communication gateways 518 can be supported in order to provide the emergency call system 100, including additional units of the second rack 504. It is further understood that the first rack 502 and the second rack 504 are coupled to each other through electrical and communication interfaces (not shown).

Figure 6:
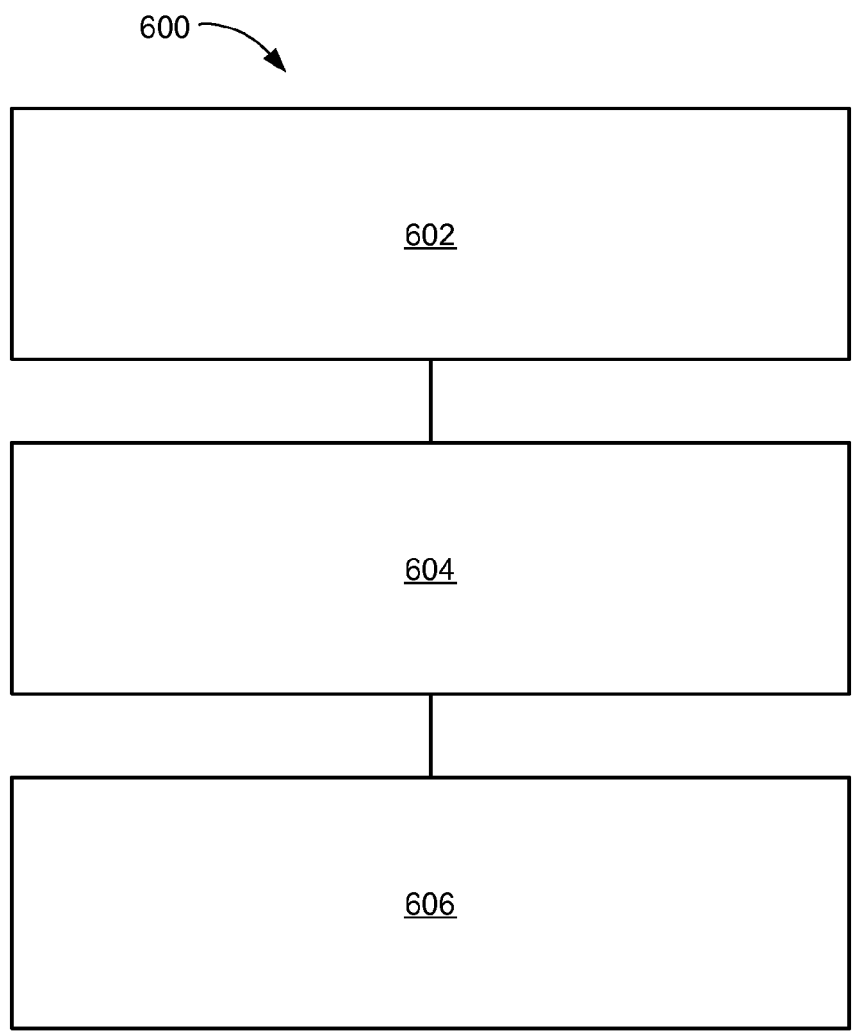
FIG. 6 is a flow chart of a method of operation of an emergency call system in a further embodiment of the present invention.

Referring now to FIG. 6, therein is shown a flow chart of a method 600 of operation of the emergency call system 100 in a further embodiment of the present invention. The method 600 includes: receiving an incoming call by a call controller in a block 602; distributing a pending call request from the call controller to a selected group of workstations in a block 604; and accepting the pending call request by one of the workstations including removing the pending call request from all others of the workstations in the selected group in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an emergency call system comprising:
   receiving an incoming call by a call controller;
   distributing a pending call request, from the call controller, to all workstations of a selected group of the workstations having an operator qualification; and
   accepting the pending call request by one of the workstations including removing the pending call request from all others of the workstations in the selected group.

2. The method as claimed in claim 1 wherein distributing the pending call request includes checking an operator qualification module for the requirements of the pending call request.

3. The method as claimed in claim 1 further comprising accessing an automatic call distribution engine by the call controller for generating the pending call request.

4. The method as claimed in claim 1 further comprising:
   monitoring by a mid-call recovery controller for reestablishing a dropped call through the call controller; and
   communicating through a communication interface between the selected group and the call controller.

5. The method as claimed in claim 1 further comprising accessing console servers by the call controller and the workstations.

6. A method of operation of an emergency call system comprising:
   receiving an incoming call by a call controller including accessing a trunk line;
   distributing a pending call request, from the call controller, to all workstations of a selected group of the workstations having an operator qualification including accessing a call center module; and
   accepting the pending call request by one of the workstations including removing the pending call request from all others of the workstations in the selected group;
   wherein:

the selected group includes accessing a second emergency call center for including a workstation in the selected group.

7. The method as claimed in claim 6 wherein distributing the pending call request includes checking an operator qualification module for the requirements of the pending call request and accessing a central database manager.

8. The method as claimed in claim 6 further comprising accessing an automatic call distribution engine by the call controller for generating the pending call request including enabling a remote call controller.

9. The method as claimed in claim 6 further comprising:
monitoring by a mid-call recovery controller for reestablishing a dropped call through the call controller including accessing a central database manager by the mid-call recovery controller; and
communicating through a communication interface between the selected group and the call controller including performing a real-time back-up by a back-up center.

10. The method as claimed in claim 6 further comprising accessing console servers by the call controller and the workstations including saving a history frame, a notes panel, an audio file screen, a map window, and a picture or video frame.

11. An emergency call system comprising:
a call controller for receiving an incoming call; and
a selected group of workstations for receiving a pending call request, from the call controller, by all of the workstations that have an operator qualification and accepting the pending call request by one of the workstations includes the pending call request withdrawn from all others of the workstations in the selected group.

12. The system as claimed in claim 11 further comprising an operator qualification module for distributing the pending call request to the selected group.

13. The system as claimed in claim 11 further comprising an automatic call distribution engine accessed by the call controller for generating the pending call request.

14. The system as claimed in claim 11 further comprising:
a mid-call recovery controller for reestablishing a dropped call through the call controller; and
a communication interface between the selected group and the call controller.

15. The system as claimed in claim 11 further comprising console servers accessed by the call controller and the workstations.

16. The system as claimed in claim 11 further comprising:
a trunk line accessed by the call controller; and
a call center module includes the workstations.

17. The system as claimed in claim 16 further comprising an operator qualification module and a central database manager accessed by the call controller for distributing the pending call request.

18. The system as claimed in claim 16 further comprising an automatic call distribution engine accessed by the call controller for generating the pending call request includes a remote call controller enabled.

19. The system as claimed in claim 16 further comprising:
a mid-call recovery controller for reestablishing a dropped call through the call controller includes a central database manager accessed by the mid-call recovery controller; and
a communication interface between the selected group and the call controller includes a back-up center for performing a real-time back-up.

20. The system as claimed in claim 16 further comprising console servers coupled to the call controller and the workstations for saving a history frame, a notes panel, an audio file screen, a map window, and a picture or video frame from a monitor.

* * * * *